United States Patent
Tao et al.

(10) Patent No.: US 10,009,975 B2
(45) Date of Patent: Jun. 26, 2018

(54) PROTECTION FOR RETROFIT LIGHT EMITTING DIODE TUBE

(71) Applicant: PHILIPS LIGHTING HOLDING B.V., Eindhoven (NL)

(72) Inventors: Haimin Tao, Eindhoven (NL); Borong Su, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/038,131

(22) PCT Filed: Nov. 12, 2014

(86) PCT No.: PCT/EP2014/074299
§ 371 (c)(1),
(2) Date: May 20, 2016

(87) PCT Pub. No.: WO2015/074917
PCT Pub. Date: May 28, 2015

(65) Prior Publication Data
US 2016/0286621 A1    Sep. 29, 2016

(30) Foreign Application Priority Data
Nov. 21, 2013    (EP) ..................... 13193851

(51) Int. Cl.
*H05B 33/08*    (2006.01)
*F21K 99/00*    (2016.01)

(52) U.S. Cl.
CPC ......... *H05B 33/0887* (2013.01); *F21K 9/175* (2013.01); *H05B 33/0815* (2013.01);
(Continued)

(58) Field of Classification Search
CPC . H05B 33/0887; H05B 33/0815; F21K 9/175; Y02B 20/341; Y02B 20/383; Y02B 20/386
See application file for complete search history.

(56) References Cited

U.S. PATENT DOCUMENTS

| 2011/0260614 | A1  | 10/2011 | Hartikka et al. |
| 2012/0306403 | A1* | 12/2012 | Chung ............... H05B 33/0818 315/291 |
| 2015/0061542 | A1* | 3/2015  | Hsia ....................... F21V 25/04 315/294 |

* cited by examiner

*Primary Examiner* — Alexander H Taningco
*Assistant Examiner* — Seokjin Kim
(74) *Attorney, Agent, or Firm* — Akarsh P. Belagodu

(57) ABSTRACT

Light sources (1) such as retrofit light emitting diode tubes comprise light circuits (11) with light emitting diodes (12) and feeding electrodes (13, 14), terminals (21-24) for exchanging signals with ballasts (2, 3) or supplies (4, 5), and filament circuits (31, 41) for coupling the terminals (21-24) and the feeding electrodes (13, 14). The filament circuits (31, 41) comprise switch circuits (32) and trigger circuits (33) for in response to presences of frequencies in the signals bringing the switch circuits (32) into conducting modes to introduce relatively low impedances in the filament circuits (31, 41). In non-conducting modes the switch circuits (32) introduce relatively large impedances. This way, in case the light source (1) is connected to a high-frequency ballast (2), the switch circuit (32) is triggered and the light source (1) is normally activated. In case the light source (1) is connected to mains (4) or an external direct-current driver (5) or an electro-magnetic ballast (3), the switch circuit (32) is not triggered, and the light source (1) is not activated and protected against damage.

14 Claims, 7 Drawing Sheets

(52) U.S. Cl.
CPC .......... *Y02B 20/341* (2013.01); *Y02B 20/383* (2013.01); *Y02B 20/386* (2013.01)

PROTECTION FOR RETROFIT LIGHT EMITTING DIODE TUBE

CROSS-REFERENCE TO PRIOR APPLICATIONS

This application is the U.S. National Phase application under 35 U.S.C. § 371 of International Application No. PCT/EP2014/074299, filed Nov. 12, 2014, which claims the benefit of European Patent Application No. 13193851.6, filed Nov. 21, 2013. These applications are hereby incorporated by reference herein.

FIELD OF THE INVENTION

The invention relates to a light source. Examples of such a light source are retrofit light emitting diode tubes.

BACKGROUND OF THE INVENTION

US 2011/0260614 A1 discloses a LED tube and lamp arrangement with two voltage detectors for offering protection against dangerously high voltages.

US 2012/0306403 A1 discloses a driver circuit for powering a DC lamp in a non-DC lamp fitting.

SUMMARY OF THE INVENTION

It is an object of the invention to provide a light source comprising an in-built protection against a misuse of the light source.

According to a first aspect, a light source is provided comprising
  a light circuit comprising one or more light emitting diodes and a first feeding electrode,
  a first terminal for exchanging a first signal with a ballast or a supply, and
  a first filament circuit coupled to the first terminal and to the first feeding electrode, wherein the first filament circuit comprises a first switch circuit and a first trigger circuit for in response to a presence of a frequency in the first signal bringing the first switch circuit into a conducting mode, the first switch circuit in the conducting mode introducing a first impedance in the first filament circuit to activate the light source and in a non-conducting mode introducing a second impedance in the first filament circuit to de-activate the light source, a value of the first impedance being smaller than a value of the second impedance, and the frequency being larger than a mains frequency.

The light source such as for example a retrofit light emitting diode tube comprises a light circuit. The light circuit comprises one or more light emitting diodes and a first feeding electrode coupled to the one or more light emitting diodes possibly via a driver. The light source further comprises a first terminal for exchanging a first signal with a ballast or a supply and a first filament circuit coupled to the first terminal and to the first feeding electrode. In a prior art situation, the first filament circuit may for example comprise one or more resistors.

To create an in-built protection against a misuse of the light source, the first filament circuit is provided with a first switch circuit and with a first trigger circuit. The first trigger circuit brings in response to a presence of a frequency in the first signal the first switch circuit into a conducting mode. The first switch circuit introduces in the conducting mode a first (relatively small) impedance in the first filament circuit and introduces in a non-conducting mode a second (relatively large) impedance in the first filament circuit. The second value may be for example be ten times larger than the first value, preferably a hundred times larger, more preferably a thousand times larger etc. Examples for the first value may be 0.01Ω or 0.1Ω or 1Ω etc. and examples for the second value may be 10 kΩ or 100 kΩ or 1 MΩ etc. The frequency to be detected by the trigger circuit is larger than a mains frequency, preferably twice as large or ten times as large or more, such as for example 1 kHz or 10 kHz or 20 kHz or 50 kHz etc., with the mains frequency being 50 Hz or 60 Hz. A high-frequency ballast for example operates at 1 kHz or 10 kHz or 20 kHz or 50 kHz etc. and exchanges a signal comprising this frequency.

As a result, in case the light source is connected to a ballast in the form of a high-frequency ballast, a frequency larger than the mains frequency in the signal exchanged with the high-frequency ballast will be present and the switch circuit will be triggered. This will result in an introduction of the first (relatively small) impedance in the first filament circuit (and in an activated light source). But in case the light source is connected to a supply in the form of mains or an external direct-current driver or to a ballast in the form of an electro-magnetic ballast, the frequency larger than the mains frequency in the signal exchanged with the mains or the external direct-current driver or the electro-magnetic ballast will not be present and the switch circuit will not be triggered. This will result in an introduction of the second (relatively large) impedance in the first filament circuit (and in a de-activated light source). This way, the light source is protected against a misuse, and this is a great advantage.

So, the light source is protected against a connection to mains and against a connection to an external direct-current driver and against a connection to an electro-magnetic ballast, without having excluded other kinds of misuses.

An embodiment of the light source is defined by the first filament circuit further comprising a first resistor circuit, the first terminal comprising first and second pins, the first switch circuit comprising a first main electrode coupled to the first pin, the first switch circuit comprising a first control electrode coupled to the first trigger circuit, the first switch circuit comprising a second main electrode coupled to a first resistor electrode of the first resistor circuit, the first resistor circuit comprising a second resistor electrode coupled to the second pin, and the first feeding electrode being coupled to the first resistor circuit, the first and second impedances being introduced between one of the first and second pins on the one hand and the first feeding electrode on the other hand and/or between the first pin and the second pin. Usually, the first and second pins are located at a first end of the light source.

An embodiment of the light source is defined by the first switch circuit comprising a triac and the first resistor circuit comprising one or more resistors. Instead of a triac, one or more thyristors or one or more transistors could be used, but a triac is a preferred solution in an alternating-current environment. In case the first resistor circuit comprises one resistor, the first feeding electrode may be coupled to either one of the first and second resistor electrodes located at the ends of the one resistor. In case the first resistor circuit comprises two or more resistors in whatever serial and/or parallel connection, the first feeding electrode may also be coupled to an intermediate resistor electrode located somewhere between the two or more resistors.

An embodiment of the light source is defined by the first trigger circuit comprising a first capacitor coupled to the first control electrode of the first switch circuit and to one of the first and second main electrodes of the first switch circuit. Instead of a capacitor, a more complex frequency detector could be used, but a capacitor is a preferred solution in view of its simplicity.

An embodiment of the light source is defined by the first trigger circuit comprising a serial connection of a first capacitor, a first resistor and a first diode, the serial connection being coupled to the first control electrode of the first switch circuit and to one of the first and second main electrodes of the first switch circuit, the first filament circuit further comprising a parallel connection of a second capacitor and a second resistor, the parallel connection being coupled to the first control electrode of the first switch circuit and to the other one of the first and second main electrodes of the first switch circuit. This first filament circuit also offers protection in case a signal coming from mains or an external direct-current driver or an electro-magnetic ballast comprises a step or a pulse which results in a short presence of a frequency larger than the mains frequency. The parallel connection of the second capacitor and the second resistor acts as a filter circuit. A combination of the filter circuit and the extended first trigger circuit prevents a mis-trigger of the first switch circuit.

An embodiment of the light source is defined by the first trigger circuit comprising a serial connection of a first capacitor and a first diode, the serial connection being coupled to the first control electrode of the first switch circuit and to one of the first and second main electrodes of the first switch circuit, the first filament circuit further comprising a parallel connection of a second capacitor and a resistor, the parallel connection being coupled to the first control electrode of the first switch circuit and to the other one of the first and second main electrodes of the first switch circuit, and the first trigger circuit further comprising a second diode coupled to a connection between the first capacitor and the first diode in the first trigger circuit and to the first feeding electrode. Via this second diode, a charge pump has been realized such that both diodes can be low voltage diodes.

An embodiment of the light source is defined by the first filament circuit further comprising a first start-up circuit coupled in parallel to the first switch circuit or to the first and second pins. The first start-up circuit improves a start-up of the light source when being connected to a ballast in the form of a high-frequency ballast.

An embodiment of the light source is defined by the first start-up circuit comprising one or more resistors. The first start-up circuit may comprise one resistor or may comprise two or more resistors in whatever serial and/or parallel connection. Each one of the one or more resistors may comprise a normal resistor or a positive temperature coefficient resistor.

An embodiment of the light source is defined by further comprising
  a second terminal for exchanging a second signal with the ballast or the supply, and
  a second filament circuit coupled to the second terminal and to a second feeding electrode of the light circuit.

An embodiment of the light source is defined by the second filament circuit comprising a second switch circuit and a second trigger circuit for in response to a presence of a frequency in the second signal bringing the second switch circuit into a conducting mode, the second switch circuit in the conducting mode introducing a third impedance in the second filament circuit to activate the light source and in a non-conducting mode introducing a fourth impedance in the second filament circuit to de-activate the light source, a value of the third impedance being smaller than a value of the fourth impedance, and the frequency being larger than a mains frequency.

An embodiment of the light source is defined by the second filament circuit further comprising a second resistor circuit, the second terminal comprising third and fourth pins, the second switch circuit comprising a third main electrode coupled to the third pin, the second switch circuit comprising a second control electrode coupled to the second trigger circuit, the second switch circuit comprising a fourth main electrode coupled to a third resistor electrode of the second resistor circuit, the second resistor circuit comprising a fourth resistor electrode coupled to the fourth pin, and the second feeding electrode being coupled to the second resistor circuit, the third and fourth impedances being introduced between one of the third and fourth pins on the one hand and the second feeding electrode on the other hand and/or between the third pin and the fourth pin. Usually, the third and fourth pins are located at a second end of the light source, with the first and second ends being opposite ends.

An embodiment of the light source is defined by the second switch circuit comprising a triac and the second resistor circuit comprising one or more resistors.

An embodiment of the light source is defined by the second trigger circuit comprising a third capacitor coupled to the second control electrode of the second switch circuit and to one of the third and fourth main electrodes of the second switch circuit.

An embodiment of the light source is defined by the second filament circuit further comprising a second start-up circuit coupled in parallel to the second switch circuit or to the third and fourth pins, the second start-up circuit comprising one or more resistors.

An embodiment of the light source is defined by the light source being designed for replacing a fluorescent lamp while keeping the ballast in the form of a high-frequency ballast, and the light source being protected against a connection to the supply in the form of mains or in the form of an external direct-current driver and against a connection to the ballast in the form of an electro-magnetic ballast.

An insight is that light sources designed to be connected to a high-frequency ballast should be protected against a connection to mains and to an external direct-current driver and to an electro-magnetic ballast. A basic idea is that a first filament circuit should introduce a relatively small impedance in response to a presence of a frequency larger than a mains frequency in the first signal exchanged with a high-frequency ballast and should introduce a relatively large impedance in response to an absence of the frequency.

A problem to provide a light source comprising an in-built protection against a misuse of the light source has been solved. A further advantage is that light source can be simple, robust and low cost.

These and other aspects of the invention will be apparent from and elucidated with reference to the embodiments described hereinafter.

DETAILED DESCRIPTION OF EMBODIMENTS

Figure 1:
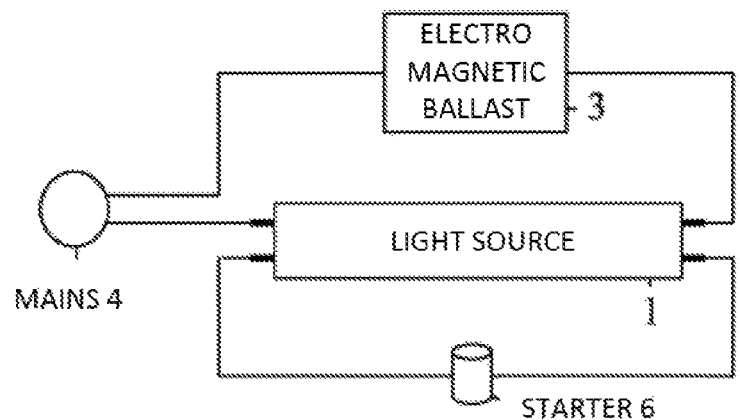
FIG. 1 shows a first failure situation.

In the FIG. 1, a first failure situation is shown. A light source 1 designed to be coupled to a high-frequency ballast is coupled to an electro-magnetic ballast 3 instead. The light source 1 comprises four pins coupled to one side of mains 4, to one side of a starter 6, to another side of the starter 6 and to one side of the electro-magnetic ballast 3, with another side of the electro-magnetic ballast 3 being coupled to another side of the mains 4. In this case, the light source 1 can be damaged and/or can become unsafe.

Figure 2:
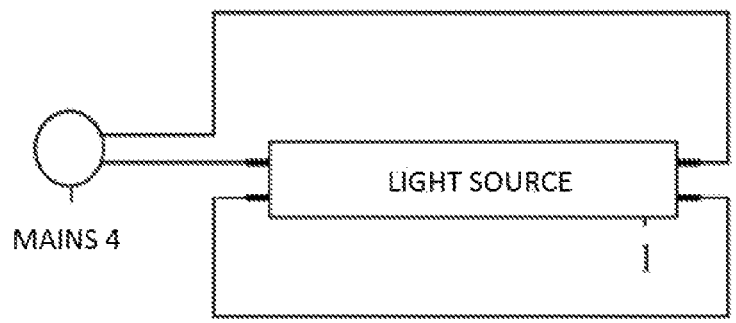
FIG. 2 shows a second failure situation.

In the FIG. 2, a second failure situation is shown. A light source 1 designed to be coupled to a high-frequency ballast is coupled to mains 4 instead. The light source 1 comprises two pins at both sides of the light source 1 coupled to mains 4 and comprises two further pins at both sides of the light source 1 coupled to each other. In this case, the light source 1 can be damaged and/or can become unsafe.

Figure 3:
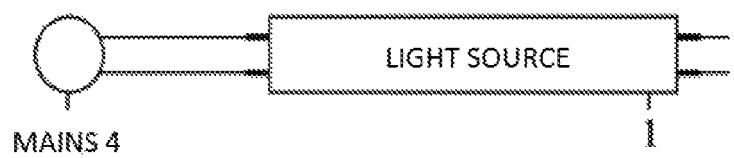
FIG. 3 shows a third failure situation.

In the FIG. 3, a third failure situation is shown. A light source 1 designed to be coupled to a high-frequency ballast is coupled to mains 4 instead. The light source 1 comprises two pins at one side of the light source 1 coupled to mains 4 and comprises two further pins at the other side of the light source 1 which are left open. In this case, the light source 1 can be damaged and/or can become unsafe.

Figure 4:
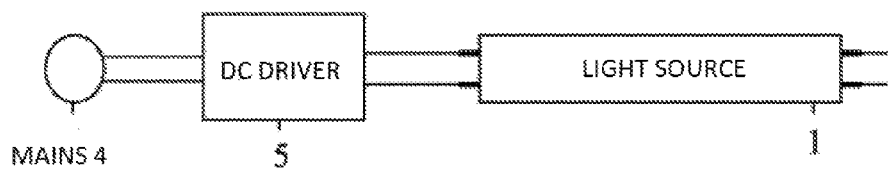
FIG. 4 shows a fourth failure situation.

In the FIG. 4, a fourth failure situation is shown. A light source 1 designed to be coupled to a high-frequency ballast is coupled to an external direct-current driver 5 instead. The light source 1 comprises two pins at one side of the light source 1 coupled to the external direct-current driver 5 and comprises two further pins at the other side of the light source 1 which are left open. The external direct-current driver 5 such as a direct-current supply or DC supply is coupled to mains 4. In this case, the light source 1 can be damaged and/or can become unsafe.

Figure 5:
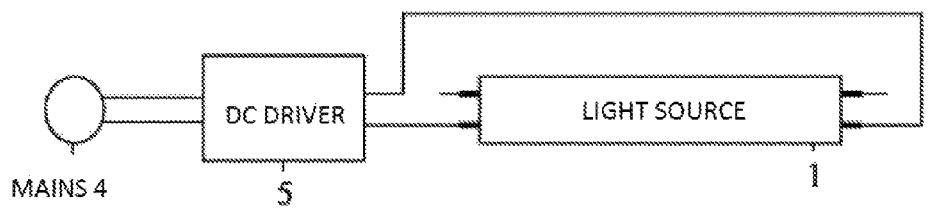
FIG. 5 shows a fifth failure situation.

In the FIG. 5, a fifth failure situation is shown. A light source 1 designed to be coupled to a high-frequency ballast is coupled to an external direct-current driver 5 instead. The light source 1 comprises two pins at both sides of the light source 1 coupled to the external direct-current driver 5 and comprises two further pins at both sides of the light source 1 which are left open. The external direct-current driver 5 such as a direct-current supply or DC supply is coupled to mains 4. In this case, the light source 1 can be damaged and/or can become unsafe.

Figure 6:
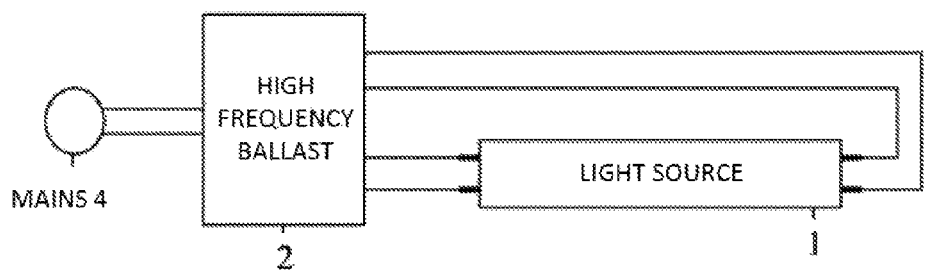
FIG. 6 shows a correct situation.

In the FIG. 6, a correct situation is shown. A light source 1 designed to be coupled to a high-frequency ballast is coupled indeed to such a high-frequency ballast 2. The light source 1 comprises four pins at both sides of the light source 1 coupled to four secondary terminals of the high-frequency ballast 2. Two primary terminals of the high-frequency ballast 2 are coupled to mains 4. In this case, the light source 1 is not damaged and is safe to operate.

Figure 7:
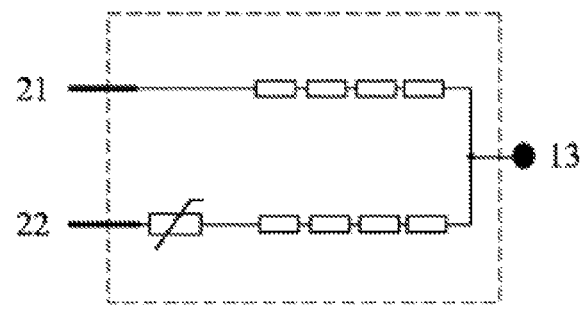
FIG. 7 shows a prior art filament circuit.

In the FIG. 7, a prior art filament circuit is shown. A filament circuit couples a terminal 21, 22 usually comprising a first pin 21 and a second pin 22 of a light source to a first feeding electrode 13 of a light circuit comprising one or more light emitting diodes. This prior art filament circuit comprises a serial combination of four resistors and a serial combination of four resistors and a positive temperature coefficient resistor.

Figure 8:
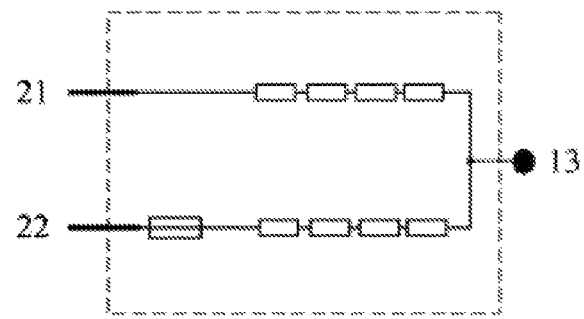
FIG. 8 shows another prior art filament circuit.

In the FIG. 8, another prior art filament circuit is shown. This prior art filament circuit comprises a serial combination of four resistors and a serial combination of four resistors and a fuse.

Figure 9:
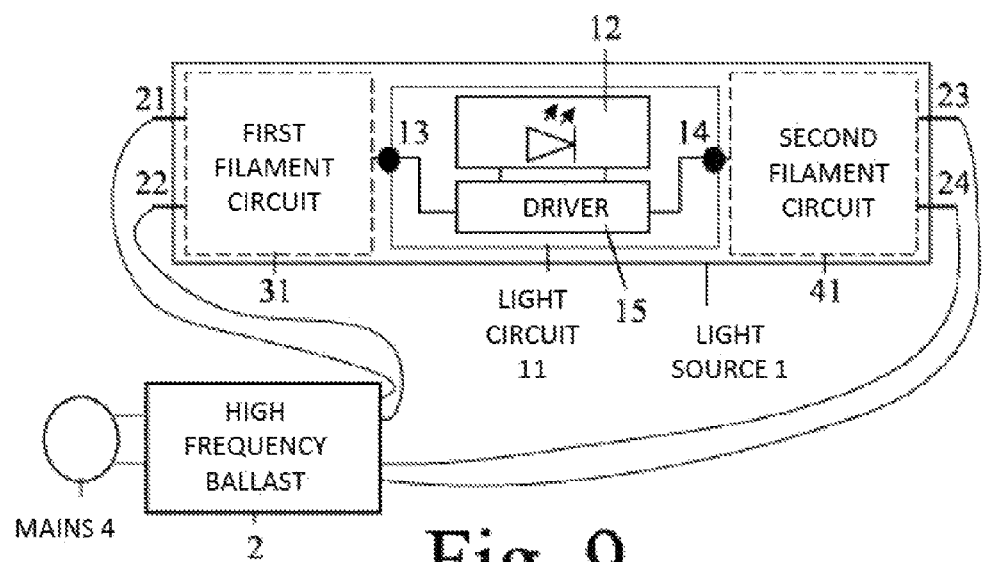
FIG. 9 shows a light source and a high-frequency ballast.

In the FIG. 9, a light source 1 and a high-frequency ballast 2 are shown. The light source 1 comprises a light circuit 11 with one or more light emitting diodes 12 coupled to first and second feeding electrodes 13, 14 possibly via a driver 15. The light source 1 further comprises a first terminal 21, 22 comprising a first pin 21 and a second pin 22 for exchanging a first signal with the high-frequency ballast 2 and a first filament circuit 31 for coupling the first terminal 21, 22 and the first feeding electrode 13. The light source 1 further comprises a second terminal 23, 24 comprising a third pin 23 and a fourth pin 24 for exchanging a second signal with the high-frequency ballast 2 and a second filament circuit 41 for coupling the second terminal 23, 24 and the second feeding electrode 14. The high-frequency ballast 2 is coupled to mains 4.

To protect the light source 1 against situations shown in the FIG. 1-5, the prior art filament circuits shown in the FIGS. 7 and 8 are to be amended, as shown in the FIG. 10-17.

Figure 10:
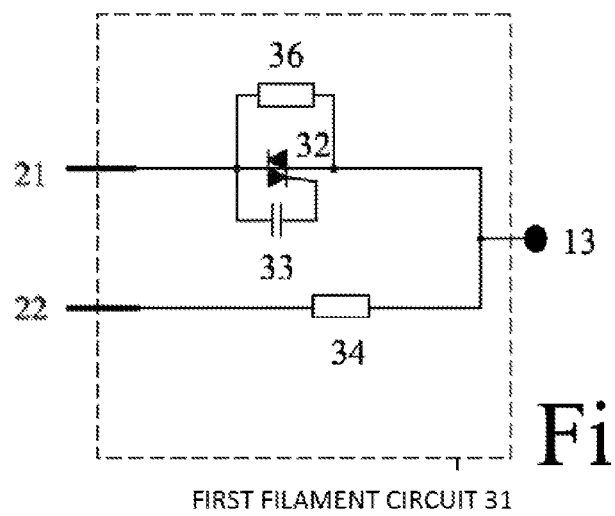
FIG. 10 shows a first embodiment for a filament circuit.

In the FIG. 10, a first embodiment for a filament circuit 31 is shown. The first filament circuit 31 comprises a first switch circuit 32 and a first trigger circuit 33 for in response to a presence of a frequency in the first signal bringing the first switch circuit 32 into a conducting mode. The first switch circuit 32 in the conducting mode introduces a first and relatively small impedance in the first filament circuit 31 and in a non-conducting mode introduces a second and relatively large impedance in the first filament circuit 31. The frequency is larger than a mains frequency.

As a result, in case the light source 1 is connected to the high-frequency ballast 2, the first trigger circuit 33 will detect the presence of the frequency larger than the mains frequency in the first signal exchanged with the high-frequency ballast 2 and will trigger the first switch circuit 32. In response to being triggered, the first switch circuit 32 will go into a conducting mode, and the light source 1 will function properly without being damaged. But in case the light source 1 is connected as shown in the FIG. 1-5, the first trigger circuit 33 will not detect the presence of the frequency larger than the mains frequency in the first signal exchanged with the high-frequency ballast 2 and will not trigger the first switch circuit 32. The first switch circuit 32 will stay in a non-conducting mode, and the light source 1 will not function, but without being damaged.

The relatively small impedance and the relatively large impedance are introduced between one of the first and second pins 21, 22 on the one hand and the first feeding electrode 13 on the other hand and/or between the first pin 21 and the second pin 22.

Preferably, the first filament circuit 31 may further comprises a first resistor circuit 34 to create a minimum direct-current impedance or DC impedance in the first filament circuit 31 and to limit a maximum amplitude of a current flowing inside the first filament circuit 31. The first switch circuit 32 may comprise a first main electrode coupled to the first pin 21 and may comprise a first control electrode coupled to the first trigger circuit 33 and may comprise a second main electrode coupled to a first resistor electrode of the first resistor circuit 34. A second resistor electrode of the first resistor circuit 34 is coupled to the second pin 22. The first feeding electrode 13 may be coupled to the first resistor circuit 34. The first switch circuit 32 may comprise a triac and the first resistor circuit 34 may comprise one or more resistors. In case the first resistor circuit 34 comprises one resistor, the first feeding electrode 13 may be coupled to either one of the first and second resistor electrodes located at the ends of the one resistor. In case the first resistor circuit 34 comprises two or more resistors in whatever serial and/or parallel connection, the first feeding electrode 13 may also be coupled to an intermediate resistor electrode located somewhere between the two or more resistors.

Preferably, the first trigger circuit 33 may comprise a first capacitor coupled to the first control electrode of the first switch circuit 32 and to one of the first and second main electrodes of the first switch circuit 32. The first filament circuit 31 may further comprise a first start-up circuit 36 coupled in parallel to the first switch circuit 32. The first start-up circuit 36 may comprise one or more resistors in whatever serial and/or parallel connection. Each one of the one or more resistors of the first start-up circuit 36 may comprise a normal resistor or a positive temperature coefficient resistor.

An optional resistor may be added and coupled to the first control electrode of the first switch circuit 32 and the first feeding electrode 13 to avoid false triggering of certain kinds of first switch circuits 32.

Figure 11:
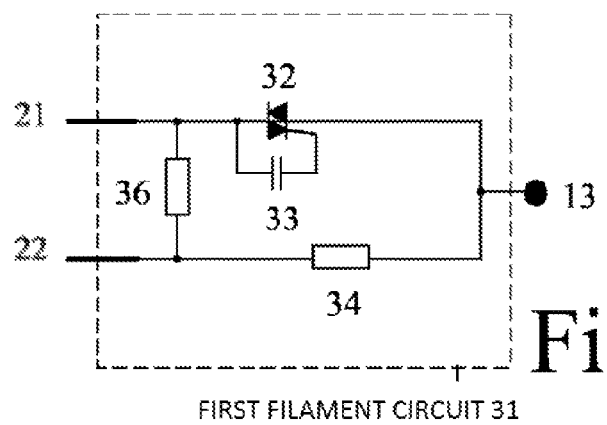
FIG. 11 shows a second embodiment for a filament circuit.

In the FIG. 11, a second embodiment for a filament circuit 31 is shown. This second embodiment differs from the first embodiment shown in the FIG. 10 in that a first start-up circuit 36 is coupled to the first and second pins 21, 22. Again, the first start-up circuit 36 may comprise one or more resistors in whatever serial and/or parallel connection. Again, each one of the one or more resistors of the first start-up circuit 36 may comprise a normal resistor or a positive temperature coefficient resistor.

In the FIGS. 10 and 11, the first resistor circuit 34 comprises one resistor located between the second pin 22 and the first feeding electrode 13.

Figure 12:
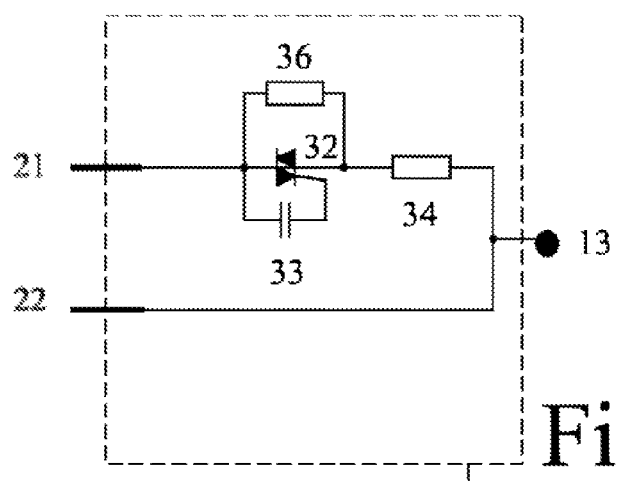
FIG. 12 shows a third embodiment for a filament circuit.

In the FIG. 12, a third embodiment for a filament circuit 31 is shown. This third embodiment differs from the first and second embodiments shown in the FIGS. 10 and 11 in that the first resistor circuit 34 comprises one resistor located between the first switch circuit 32 and the first feeding electrode 13.

Figure 13:
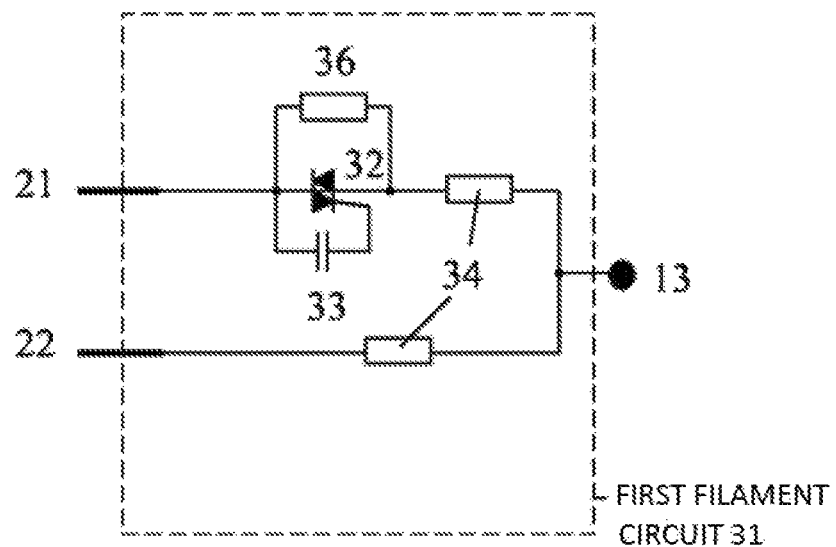
FIG. 13 shows a fourth embodiment for a filament circuit.

In the FIG. 13, a fourth embodiment for a filament circuit 31 is shown. This fourth embodiment differs from the first, second and third embodiments shown in the FIG. 10-12 in that the first resistor circuit 34 comprises two resistors, one of them located between the first switch circuit 32 and the first feeding electrode 13 and the other one located between the second pin 22 and the first feeding electrode 13.

Figure 14:
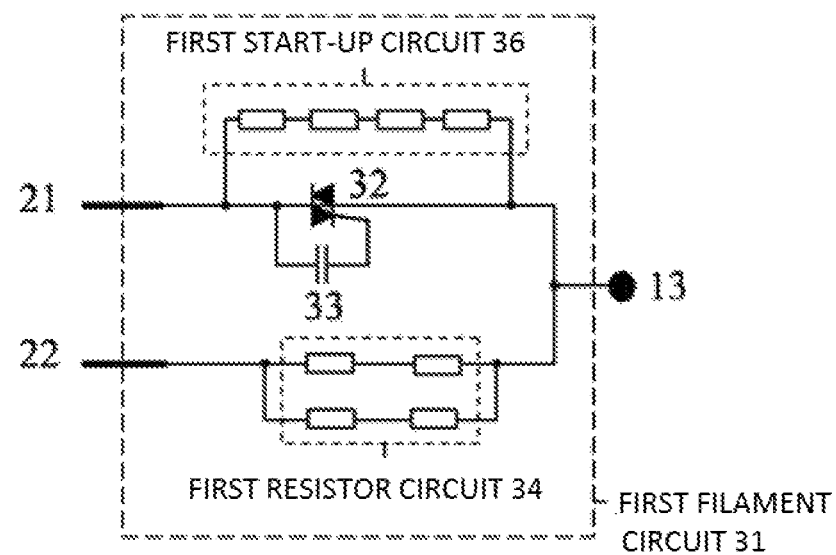
FIG. 14 shows a fifth embodiment for a filament circuit.

In the FIG. 14, a fifth embodiment for a filament circuit 31 is shown. This fifth embodiment differs from the first embodiment shown in the FIG. 10 in that the first resistor circuit 34 comprises a parallel connection of two branches, each branch comprising two serially coupled resistors and in that the first start-up circuit 36 comprises four serially coupled resistors.

Figure 15:
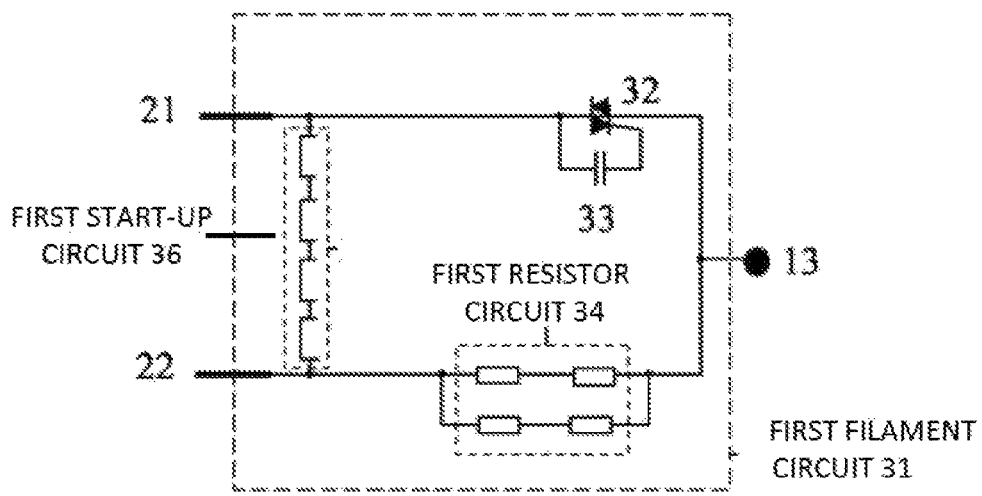
FIG. 15 shows a sixth embodiment for a filament circuit.

In the FIG. 15, a sixth embodiment for a filament circuit 31 is shown. This sixth embodiment differs from the second embodiment shown in the FIG. 11 in that the first resistor circuit 34 comprises a parallel connection of two branches, each branch comprising two serially coupled resistors and in that the first start-up circuit 36 comprises four serially coupled resistors.

Figure 16:
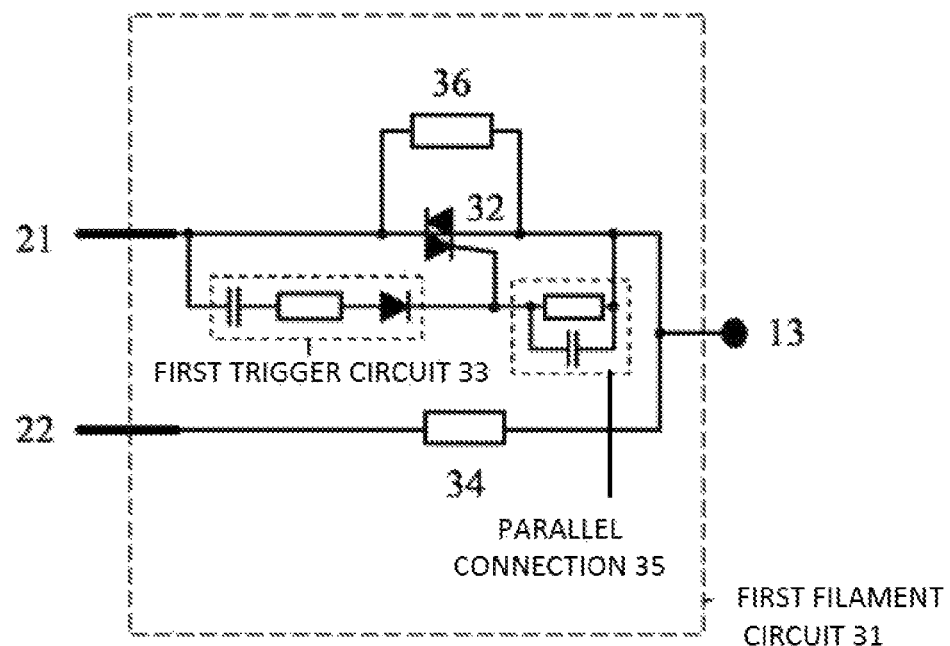
FIG. 16 shows a seventh embodiment for a filament circuit.

In the FIG. 16, a seventh embodiment for a filament circuit 31 is shown. This seventh embodiment differs from the first embodiment shown in the FIG. 10 in that the first trigger circuit 33 comprises a serial connection of a first capacitor, a first (current limiting) resistor and a first (rectifying) diode. This serial connection is coupled to the first control electrode of the first switch circuit 32 and to one of the first and second main electrodes of the first switch circuit 32. This first filament circuit 31 further comprises a parallel connection 35 of a second capacitor and a second resistor. This parallel connection 35 is coupled to the first control electrode of the first switch circuit 32 and to the other one of the first and second main electrodes of the first switch circuit 32. This seventh embodiment also offers protection in case a signal coming from mains 4 or an external direct-current driver 5 or an electro-magnetic ballast 3 comprises a step or a pulse which results in a short presence of a frequency larger than the mains frequency. The parallel connection 35 of the second capacitor and the second resistor acts as a filter circuit. A combination of the filter circuit and the extended first trigger circuit 33 prevents a mis-trigger of the first switch circuit 32.

Figure 17:
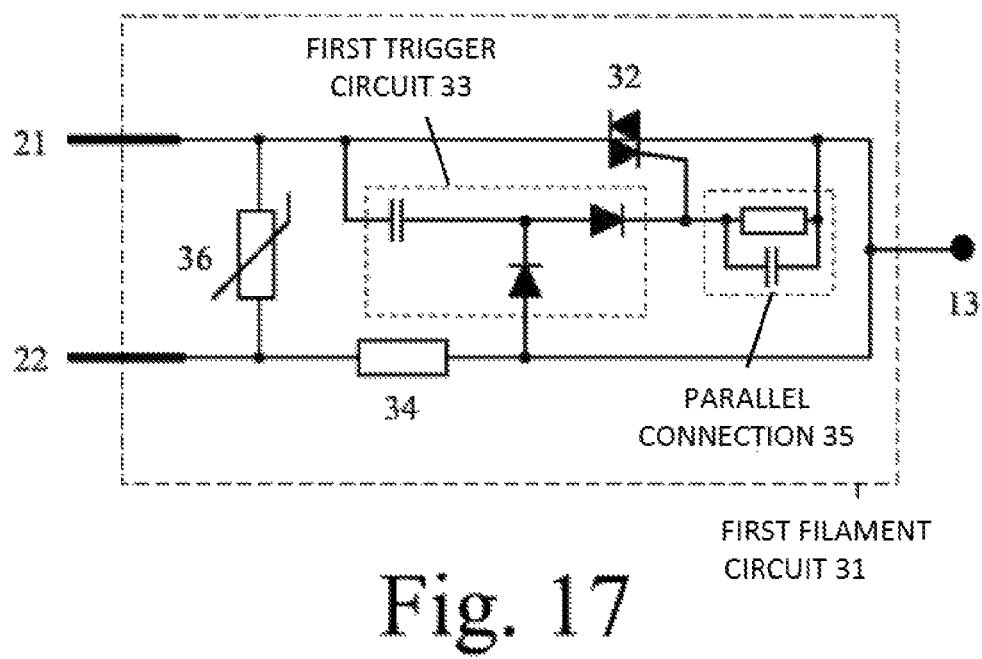
FIG. 17 shows an eighth embodiment for a filament circuit.

In the FIG. 17, an eighth embodiment for a filament circuit 31 is shown. This eighth embodiment differs from the seventh embodiment shown in the FIG. 16 in that in the first trigger circuit 33 the first (current limiting) resistor has been left out and in that a connection between the first capacitor and the first (rectifying) diode in the first trigger circuit 33 is coupled to the first feeding electrode 13 via a second diode. Via this second diode, a charge pump has been realized such that both diodes can be low voltage diodes. Further, the first start-up circuit 36 here comprises a positive temperature coefficient resistor coupled to the first and second pins 21, 22.

So, the first trigger circuit 33 may preferably comprise a capacitor, possibly extended with a first diode, further possibly extended with a first (current limiting) resistor and/or a second diode.

The first to eighth embodiments shown in the FIG. 10-17 may also be introduced for the second filament circuit 41 shown in the FIG. 9. The first and second filament circuits 31, 41 may be realized through identical embodiments or through different embodiments. The first switch circuit 32 in the form of a triac and the first trigger circuit 33 comprising a capacitor are simple and low cost embodiments, but other kinds of switch circuits and trigger circuits will be possible too and are not to be excluded. First and second elements can be coupled directly without a third element being in between and can be coupled indirectly via a third element. Compared to one resistor, a combination of two or more resistors can survive a higher voltage and/or a larger amount of power.

Summarizing, light sources 1 such as retrofit light emitting diode tubes comprise light circuits 11 with light emitting diodes 12 and feeding electrodes 13, 14, terminals 21-24 for exchanging signals with ballasts 2, 3 or supplies 4, 5, and filament circuits 31, 41 for coupling the terminals 21-24 and the feeding electrodes 13, 14. The filament circuits 31, 41 comprise switch circuits 32 and trigger circuits 33 for in response to presences of frequencies in the signals bringing the switch circuits 32 into conducting modes to introduce relatively low impedances in the filament circuits 31, 41. In non-conducting modes the switch circuits 32 introduce relatively large impedances. This way, in case the light source 1 is connected to a high-frequency ballast 2, the switch circuit 32 is triggered and the light source 1 is normally activated. In case the light source 1 is connected to mains 4 or an external direct-current driver 5 or an electro-magnetic ballast 3, the switch circuit 32 is not triggered, and the light source 1 is not activated and protected against damage.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light source comprising:
    a light circuit comprising one or more light emitting diodes and a first feeding electrode,
    a first terminal, comprising a first pin and a second pin, for exchanging a first signal with a ballast or a supply, and
    a first filament circuit coupled to the first terminal and to the first feeding electrode, wherein the first filament circuit comprises a first switch circuit including a triac, a first trigger circuit including a capacitor for in response to a presence of a frequency in the first signal bringing the first switch circuit into a conducting mode, and a first resistor circuit being directly coupled to the first feeding electrode and comprising a first resistor electrode and a second resistor electrode, the second resistor electrode directly coupled to the second pin,
    wherein the first switch circuit comprises a first main electrode directly coupled to the first pin, a second main electrode directly coupled to the first resistor electrode, and a control electrode directly coupled to the capacitor,
    wherein the first switch circuit in the conducting mode introduces a first impedance in the first filament circuit to activate the light source and in a non-conducting mode introducing a second impedance in the first filament circuit to de-activate the light source, a value of the first impedance being smaller than a value of the second impedance, and the frequency being larger than a mains frequency,
    wherein the first and second impedances are introduced between one of the first and second pins on the one hand and the first feeding electrode on the other hand and/or between the first pin and the second pin.

2. The light source as defined in claim 1, the first switch circuit comprising a triac and the first resistor circuit comprising one or more resistors.

3. The light source as defined in claim 1, the first trigger circuit comprising a first capacitor coupled to the first control electrode of the first switch circuit and to one of the first and second main electrodes of the first switch circuit.

4. The light source as defined in claim 1, the first trigger circuit comprising a serial connection of a first capacitor, a first resistor and a first diode, the serial connection being coupled to the first control electrode of the first switch circuit and to one of the first and second main electrodes of the first switch circuit, the first filament circuit further comprising a parallel connection of a second capacitor and a second resistor, the parallel connection being coupled to the first control electrode of the first switch circuit and to the other one of the first and second main electrodes of the first switch circuit.

5. The light source as defined in claim 1, the first trigger circuit comprising a serial connection of a first capacitor and a first diode, the serial connection being coupled to the first control electrode of the first switch circuit and to one of the first and second main electrodes of the first switch circuit, the first filament circuit further comprising a parallel connection of a second capacitor and a resistor, the parallel connection being coupled to the first control electrode of the first switch circuit and to the other one of the first and second main electrodes of the first switch circuit, and the first trigger circuit further comprising a second diode coupled to a connection between the first capacitor and the first diode in the first trigger circuit and to the first feeding electrode.

6. The light source as defined in claim 1, the first filament circuit further comprising a first start-up circuit coupled in parallel to the first switch circuit or to the first and second pins.

7. The light source as defined in claim 6, the first start-up circuit comprising one or more resistors.

8. The light source as defined in claim 1, further comprising
    a second terminal, for exchanging a second signal with the ballast or the supply, and
    a second filament circuit coupled to the second terminal and to a second feeding electrode of the light circuit.

9. The light source as defined in claim 8, the second filament circuit comprising a second switch circuit and a second trigger circuit for in response to a presence of a frequency in the second signal bringing the second switch circuit into a conducting mode, the second switch circuit in the conducting mode introducing a third impedance in the second filament circuit to activate the light source and in a non-conducting mode introducing a fourth impedance in the second filament circuit to de-activate the light source, a value of the third impedance being smaller than a value of the fourth impedance, and the frequency being larger than a mains frequency.

10. The light source as defined in claim 9, the second filament circuit further comprising a second resistor circuit, the second terminal comprising third and fourth pins, the second switch circuit comprising a third main electrode coupled to the third pin, the second switch circuit comprising a second control electrode coupled to the second trigger circuit, the second switch circuit comprising a fourth main electrode coupled to a third resistor electrode of the second resistor circuit, the second resistor circuit comprising a fourth resistor electrode coupled to the fourth pin, and the second feeding electrode being coupled to the second resistor circuit, the third and fourth impedances being introduced between one of the third and fourth pins, on the one hand and the second feeding electrode on the other hand and/or between the third pin and the fourth pin.

11. The light source as defined in claim 10, the second switch circuit comprising a triac and the second resistor circuit comprising one or more resistors.

12. The light source as defined in claim 10, the second trigger circuit comprising a third capacitor coupled to the second control electrode of the second switch circuit and to one of the third and fourth main electrodes of the second switch circuit.

13. The light source as defined in claim 10, the second filament circuit further comprising a second start-up circuit coupled in parallel to the second switch circuit or to the third and fourth pins, the second start-up circuit comprising one or more resistors.

14. The light source as defined in claim 1, the light source being designed for replacing a fluorescent lamp while keeping the ballast in the form of a high-frequency ballast, and the light source being protected against a connection to the supply in the form of mains or in the form of an external direct-current driver and against a connection to the ballast in the form of an electro-magnetic ballast.

* * * * *